United States Patent
Fang

(10) Patent No.: US 8,045,446 B2
(45) Date of Patent: Oct. 25, 2011

(54) METHOD, DEVICE AND SYSTEM FOR ELIMINATING DSL CROSSTALK

(75) Inventor: Liming Fang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 174 days.

(21) Appl. No.: 12/539,772

(22) Filed: Aug. 12, 2009

(65) Prior Publication Data

US 2009/0296792 A1 Dec. 3, 2009

Related U.S. Application Data

(63) Continuation of application No. PCT/CN2008/073207, filed on Nov. 26, 2008.

(30) Foreign Application Priority Data

Nov. 29, 2007 (CN) .......................... 2007 1 0077480

(51) Int. Cl.
*H04J 1/12* (2006.01)
(52) U.S. Cl. .................... 370/201; 370/289; 370/286
(58) Field of Classification Search .................. 370/201, 370/210, 290, 292, 286, 289
See application file for complete search history.

(56) References Cited

U.S. PATENT DOCUMENTS

| | | | | |
|---|---|---|---|---|
| 5,995,567 A | * | 11/1999 | Cioffi et al. | 375/346 |
| 6,999,504 B1 | * | 2/2006 | Amrany et al. | 375/222 |
| 7,142,595 B1 | * | 11/2006 | Duvaut et al. | 375/232 |
| 7,315,592 B2 | * | 1/2008 | Tsatsanis et al. | 375/346 |
| 7,593,458 B2 | * | 9/2009 | Cioffi | 375/222 |
| 2002/0093908 A1 | * | 7/2002 | Yeap | 370/201 |
| 2006/0274893 A1 | * | 12/2006 | Cioffi et al. | 379/399.01 |
| 2008/0123755 A1 | * | 5/2008 | Clausen | 375/260 |

FOREIGN PATENT DOCUMENTS

| | | |
|---|---|---|
| CN | 1863099 A | 11/2006 |
| WO | WO 2006/129141 A1 | 12/2006 |

OTHER PUBLICATIONS

International Search Report from P.R. China in International Application No. PCT/CN2008/073207 mailed, Mar. 5, 2009.

(Continued)

*Primary Examiner* — Ricky Ngo
*Assistant Examiner* — Dewanda Samuel
(74) *Attorney, Agent, or Firm* — Finnegan, Henderson, Farabow, Garrett & Dunner LLP

(57) ABSTRACT

A method for eliminating DSL crosstalk is provided. The method includes steps of a coordinated transceiver device notifies an existing online opposite device of a signal sent to a new online opposite device; the coordinated transceiver device receives a calculation result that is obtained by the existing online opposite device based on a detected error signal and the signal sent to the new online opposite device, the coordinated transceiver device updates the coefficient of a vector pre-encoder according to the calculation result. A computer program tangibly embodied on a computer-readable storage medium, computer-readable storage medium, DSL opposite device, DSL coordinated transceiver device and system for eliminating the DSL crosstalk are also provided to implement the method. The provided method may reduce the duration of the crosstalk that the new online opposite device generates on the existing online opposite device, and enable the new online opposite device to join a vector group faster.

16 Claims, 3 Drawing Sheets

OTHER PUBLICATIONS

Written Opinion of the International Searching Authority (translation) dated (mailed) Mar. 5, 2009, issued in related Application No. PCT/CN2008/073207, filed Nov. 26, 2008, Huawei Technologies Co., Ltd. 3 pages.

Supplementary European Search Report dated (mailed) Jun. 8, 2010, issued in related Application No. 08862670,0-1246, PCT/CN2008/073207, filed Nov. 26, 2008, Hauwei Technologies Co., Ltd.

* cited by examiner

METHOD, DEVICE AND SYSTEM FOR ELIMINATING DSL CROSSTALK

This application is a continuation of PCT patent application No. PCT/CN2008/073207 filed on Nov. 26, 2008, which claims priority to Chinese Patent Application No. 200710077480.1, filed with the Chinese Patent Office on Nov. 29, 2007 and entitled "Method, Device and System for Eliminating Crosstalk between Digital Subscriber Lines", both of which are incorporated herein by reference in its entirety.

TECHNICAL FIELD

The disclosed embodiments relate to network communications, and in particular, to a method, device and system for eliminating DSL crosstalk.

BACKGROUND

A digital subscriber line (DSL) is a data transmission technology using telephone twisted pairs as transmission medium. xDSL is a combination of the DSL technology, which includes a high-speed digital subscriber line (HDSL), a single-pair high-speed digital subscriber line (SHDSL), and an asymmetrical digital subscriber line (ADSL), and the like. The SHDSL is based on baseband transmission. Other xDSLs are based on passband transmission, use the frequency-division multiplexing technology, and may coexist with a plain old telephone service (POTS) in the same twisted pairs.

With higher frequency bands used by the xDSL based on passband transmission, the crosstalk at high frequency band has become a severe problem. FIG. 1 shows a method for solving the crosstalk problem between xDSLs by using a vectored digital subscriber line (vectored-DSL) technology in the conventional art. In the downlink direction, x indicates N×1 signal vectors sent by a coordinated transceiver device (may be a digital subscriber line access multiplexer (DSLAM)); y indicates signal vectors received by N×1 opposite devices (may be a subscriber-side device); and n indicates N×1 noise vectors. A shared channel is expressed by a channel transmission matrix as follow:

$$H = \begin{bmatrix} h_{11} & h_{12} & \ldots & h_{1M} \\ h_{21} & h_{22} & \ldots & H_{2M} \\ \vdots & \vdots & \ddots & \vdots \\ h_{N1} & h_{N2} & \ldots & h_{NN} \end{bmatrix}$$

$h_{ij}(1 \leq i \leq N, 1 \leq j \leq N)$ indicates a crosstalk transfer function of pair j to pair i; $h_{ii}(1 \leq i \leq N)$ indicates the channel transfer function of pair i; and N indicates the number of pairs, i.e., the number of subscribers. If a vector pre-encoder (represented by W) is introduced in the coordinated transceiver device, the signal vectors received by the opposite device receive are calculated by the following formula:

$$\tilde{y} = HWx + n$$

If the vector pre-encoder can make HW a diagonal matrix, for example, diag (H), the crosstalk may be eliminated.

Supposing N−1 opposite devices are already online and enter a good crosstalk elimination state, the vector pre-encoder of the coordinated transceiver device may be represented as follows:

$$W_{N-1} = \begin{bmatrix} W_{11} & W_{12} & \ldots & W_{1,N-1} \\ W_{21} & W_{22} & \ldots & W_{2,N-1} \\ \vdots & \vdots & \ddots & \vdots \\ W_{N-1,1} & W_{N-1,2} & \ldots & W_{N-1,N-1} \end{bmatrix}$$

If a first-order filter structure is used, all the diagonal elements are 1. When the $N^{th}$ opposite device goes online, two steps need to be performed: activating a line and joining a vector group. Before these two steps are performed, the $N^{th}$ opposite device may generate crosstalk on N−1 online opposite devices, and even cause devices to go offline. Thus, when the $N^{th}$ opposite device goes online, it should not bring about crosstalk that exceeds the tolerance level of N−1 opposite devices. In addition, the process of going online should be as short as possible. In this case, the vector pre-encoder is as follows:

$$W_N = \begin{bmatrix} W_{11} & W_{12} & \ldots & W_{1,N-1} & W_{1,N} \\ W_{21} & W_{22} & \ldots & W_{2,N-1} & W_{2,N} \\ \vdots & \vdots & \ddots & \vdots & \vdots \\ W_{N-1,1} & W_{N-1,2} & \ldots & W_{N-1,N-1} & W_{N-1,N} \\ W_{N,1} & W_{N,2} & \ldots & W_{N,N-1} & W_{N,N} \end{bmatrix}$$

Compared with $W_{N-1}$, $W_N$ is added with a row and a column of vectors. The added column of vectors is used to eliminate the crosstalk of the $N^{th}$ opposite device on N−1 online opposite devices. Thus, to reduce the crosstalk of the $N^{th}$ opposite device on N−1 online opposite devices quickly, the vectors in the column of N−1 dimensions should be calculated in a short time. In the conventional art, the opposite device needs to transmit a large amount of data back to the coordinated transceiver device. However, the capacity of the feedback channel from the opposite device to the coordinated transceiver device is limited, which prolongs the time required for calculating the vectors in the new added column.

SUMMARY

The disclosed embodiments provide a method, device and system for eliminating the crosstalk between digital subscriber lines (DSLs) to overcome the time consuming weakness of the conventional art when the prior art is used to eliminate the crosstalk that a new online opposite device generates on an existing online opposite device.

Consistent with some embodiments, a method for eliminating the crosstalk is provided. The method may include: notifying, by a coordinated transceiver device, an existing online opposite device of a signal sent to a new online opposite device; receiving, by the coordinated transceiver device, a calculation result that is obtained by the existing online opposite device through calculation based on a detected error signal and the signal sent to the new online opposite device; and updating, by the coordinated transceiver device, a coefficient of a vector pre-encoder based on the calculation result.

A DSL opposite device is provided. In some embodiments, the device may include: an obtaining unit, adapted to obtain a signal that a coordinated transceiver device sends to a new online opposite device; a detecting unit, adapted to detect an error signal; a calculating unit, adapted to perform calculation based on the detected error signal and the obtained signal sent to the new online opposite device; and a feedback unit, adapted to feed back the calculation result obtained by the calculating unit to the coordinated transceiver device.

A DSL coordinated transceiver device is provided. In some embodiments, the device may include: a notifying unit, adapted to notify an existing online opposite device of a signal sent to a new online opposite device; a receiving unit, adapted to receive a calculation result fed back by the existing online opposite device, where the calculation result is obtained by the existing online opposite device through calculation based on a detected error signal and the signal sent to the new online opposite device; and an updating unit, adapted to update a coefficient of a vector pre-encoder according to the calculation result.

A system for eliminating the crosstalk between DSLs is provided. In some embodiments, the system may include an opposite device and a coordinated transceiver device, where the opposite device includes: an obtaining unit, adapted to obtain a signal that the coordinated transceiver device sends to a new online opposite device; a detecting unit, adapted to detect an error signal; a calculating unit, adapted to perform calculation based on the detected error signal and the obtained signal sent to the new online opposite device; and a feedback unit, adapted to feed back the calculation result of the calculating unit to the coordinated transceiver device; and the coordinated transceiver device includes: a notifying unit, adapted to notify an existing online opposite device of the signal sent to the new online opposite device; a receiving unit, adapted to receive the calculation result fed back by the existing online opposite device; and an updating unit, adapted to update a coefficient of a vector pre-encoder based on the calculation result.

As seen from the preceding examples, the disclosed embodiments provide a method, a device and a system for eliminating the crosstalk between DSLs. The opposite device performs the calculation, which greatly reduces the amount of data transmitted back to the coordinated transceiver device. Thus, the duration of crosstalk that the new online opposite device generates on the existing online opposite device may be greatly reduced, and the new opposite device may join the vector group faster.

DETAILED DESCRIPTION

Figure 1:
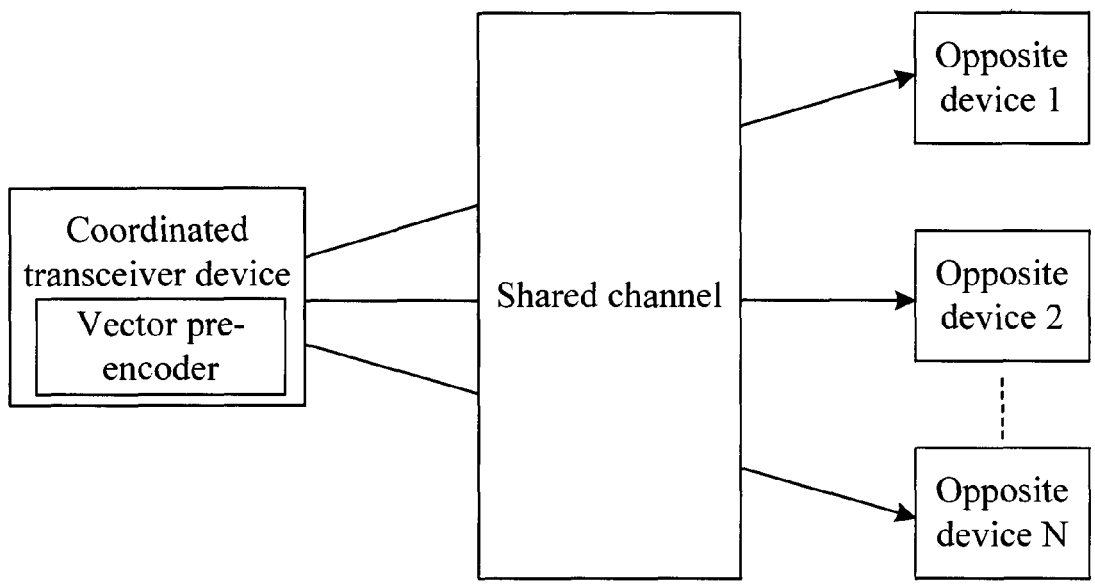
FIG. 1 shows a method for solving crosstalk between xDSLs by using a vectored-DSL technology in the conventional art.
Figure 2:
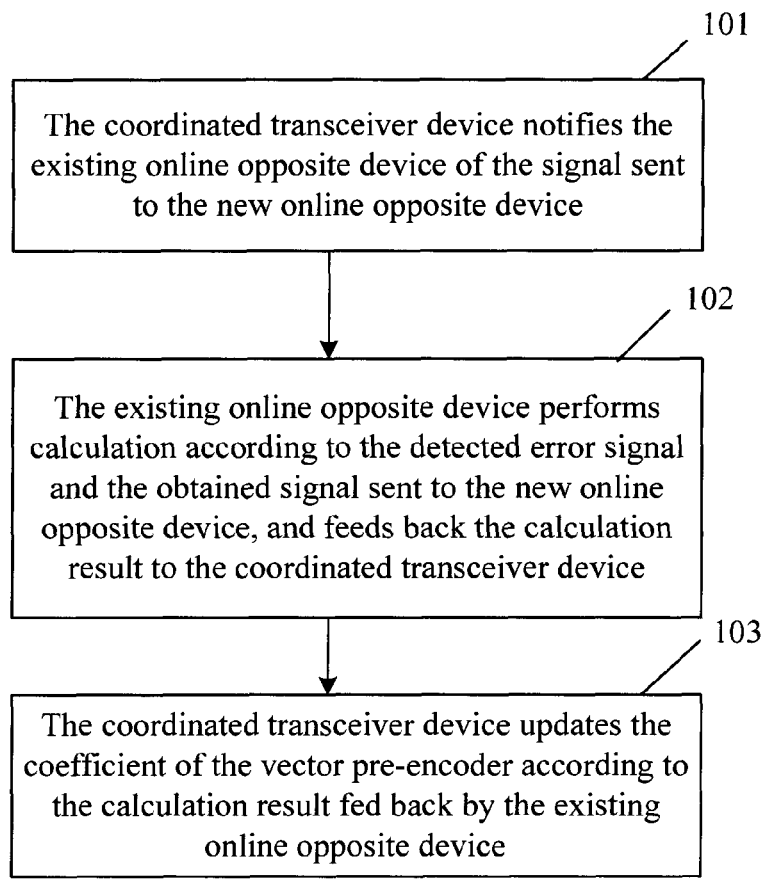
FIG. 2 shows a method for eliminating crosstalk between DSLs in a first embodiment.

FIG. 2 shows a method for eliminating the crosstalk between DSLs consistent with some embodiments. The method includes the following steps:

Step 101: The coordinated transceiver device notifies an existing online opposite device of a signal sent to a new online opposite device.

The coordinated transceiver device may notify the existing online opposite device of the signal sent to the new online opposite device by respectively configuring a sequence generator with the same structure in each of the coordinated transceiver device and the opposite device. The coordinated transceiver device may send only the initial value of the sequence generator that is used to generate the signal sent to the new online opposite device, and the time when the signal is sent to the new online opposite device, to the existing online opposite device. In this case, when the coordinated transceiver device sends the signal generated by the sequence generator to the new online opposite device, the existing online opposite device may obtain the signal according to the sequence generator, the received initial value of the sequence generator, and the time when the signal is sent.

The coordinated transceiver device may also notify the existing online opposite device of the signal sent to the new online opposite device by respectively pre-storing a certain number of same signal sequences in the coordinated transceiver device and the opposite device. The coordinated transceiver device may send only the ID of the signal sequence that is used to generate the signal sent to the new online opposite device, and the time when the signal is sent to the new online opposite device, to the existing online opposite device. In this case, when the coordinated transceiver device sends the signal generated by the signal sequence to the new online opposite device, the existing online opposite device may obtain the signal according to the stored signal sequences, the received ID of the signal sequence, and the time when the signal is sent.

Step 102: The existing online opposite device performs a calculation according to a detected error signal and the obtained signal sent to the new online opposite device, and feeds back the calculation result to the coordinated transceiver device.

For the error signal detected by the existing online opposite device, a sample received by the existing online opposite device may be judged, so as to obtain a decision sample, and then the error signal may be obtained according to the difference between the received sample and the decision sample.

The existing online opposite device can perform the calculation based on the following formula according to the detected error signal and the obtained signal sent to the new online opposite device:

$$r_i = \sum_{n=1}^{M} X^*(n) E_i(n)$$

Supposing N−1 opposite devices already go online, $i(1 \leq i \leq (N-1))$ indicates any of the N−1 online opposite devices. M indicates a certain accumulation time; X(n) indicates the signal that the coordinated transceiver device sends to the new online opposite device; X*(n) indicates the conjugation of X(n). $E_i(n)$ indicates the error signal detected by the $i^{th}$ existing online opposite device when the coordinated transceiver device sends X(n) to the new online opposite device. The existing online opposite device multiplies the conjugation of the obtained signal sent to the new online opposite device by the detected error signal, and accumulates the product for a certain time to obtain the calculation result.

The existing online opposite device can also perform the calculation by the following formula according to the detected error signal and the obtained signal sent to the new online opposite device:

$$r_i = \mu \sum_{n=1}^{M} X^*(n)E_i(n)$$

μ indicates the adaptive step factor. The existing online opposite device multiplies the conjugation of the obtained signal sent to the new online opposite device by the detected error signal and the adaptive step factor, and accumulates the product for a certain time to obtain the calculation result.

The $i^{th}$ existing online opposite device feeds back the calculation result $r_i$ to the coordinated transceiver device.

Step 103: The coordinated transceiver device updates the coefficient of the vector pre-encoder according to the calculation result fed back by the existing online opposite device.

When the calculation result fed back by the existing online opposite device may be calculated by the formula $$r_i = \sum_{n=1}^{M} X^*(n)E_i(n),$$

the coordinated transceiver device updates the coefficient of the vector pre-encoder according to the following formula:

$$W_{i,N}(\text{new}) = W_{i,N}(\text{old}) - \mu r_i$$

$W_{i,N}(\text{old})$ indicates the old coefficient of the vector pre-encoder for eliminating the crosstalk that the $N^{th}$ new online opposite device generates on the $i^{th}$ existing online opposite device; $W_{i,N}(\text{new})$ indicates the updated coefficient of the vector pre-encoder for eliminating the crosstalk that the $N^{th}$ new online opposite device generates on the $i^{th}$ online opposite device. The coordinated transceiver device decreases the coefficient of the vector pre-encoder for eliminating the crosstalk that the new online opposite device generates on the existing online opposite device by the product of the calculation result and adaptive step factor.

When the calculation result fed back by the existing online opposite device is calculated by the formula $$r_i = \mu \sum_{n=1}^{M} X^*(n)E_i(n),$$

the coordinated transceiver device updates the coefficient of the vector pre-encoder according to the following formula:

$$W_{i,N}(\text{new}) = W_{i,N}(\text{old}) - r_i$$

The coordinated transceiver device decreases the coefficient of the vector pre-encoder for eliminating the crosstalk that the new online opposite device generates on the existing online opposite device by the calculation result.

According to the method for eliminating the crosstalk between DSLs in this embodiment, the opposite device performs the calculation, which greatly reduces the amount of data transmitted back to the coordinated transceiver device. Thus, the duration of the crosstalk that the new online opposite device generates on the existing online opposite device may be reduced, and the new opposite device may join the vector group faster.

Figure 3:
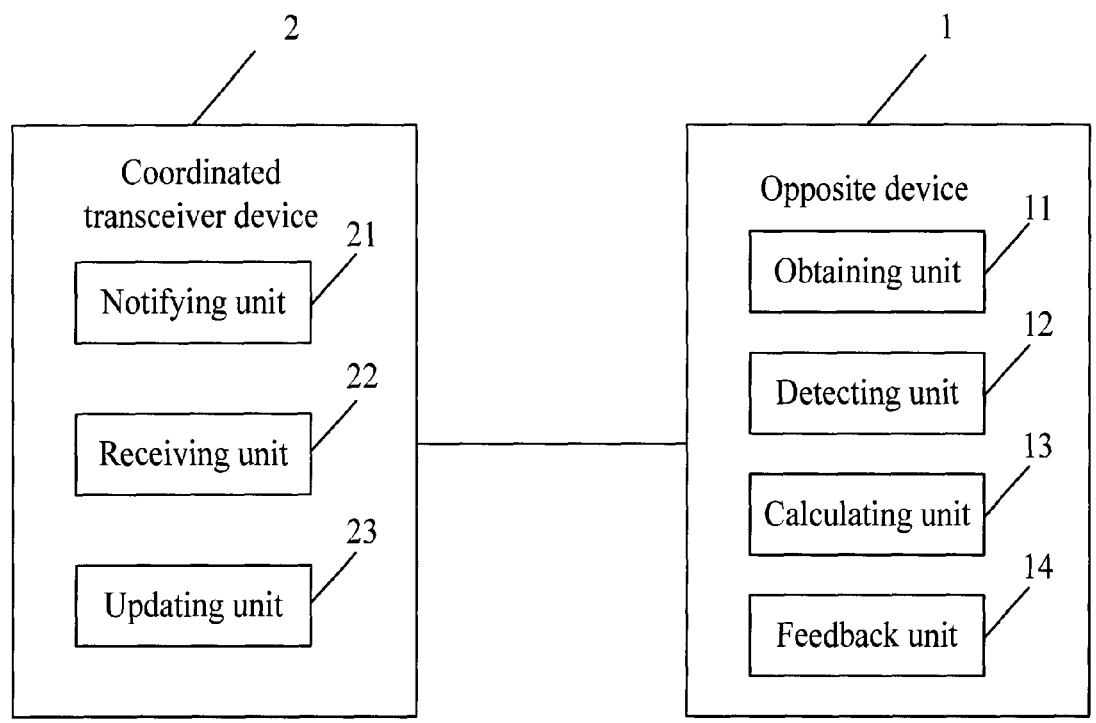
FIG. 3 shows a system for eliminating crosstalk between DSLs in a second embodiment.

FIG. 3 shows a system for eliminating the crosstalk between DSLs consistent with some embodiments. The system may include at least an opposite device 1 and a coordinated transceiver device 2.

The opposite device 1 may include an obtaining unit 11, a detecting unit 12, a calculating unit 13, and a feedback unit 14. The obtaining unit 11 is configured to obtain the signal that the coordinated transceiver device sends to a new online opposite device; the detecting unit 12 is configured to detect an error signal; the calculating unit 13 is configured to perform a calculation based on the detected error signal and the obtained signal sent to the new online opposite device; and the feedback unit 14 is configured to feed back the calculation result of the calculating unit to the coordinated transceiver device.

Correspondingly, the coordinated transceiver device 2 includes a notifying unit 21, a receiving unit 22, and an updating unit 23. The notifying unit 21 is configured to notify an existing online opposite device of a signal sent to the new online opposite device; the receiving unit 22 is configured to receive the calculation result fed back by the existing online opposite device; and the updating unit 23 is configured to update the coefficient of the vector pre-encoder according to the calculation result.

Figure 4:
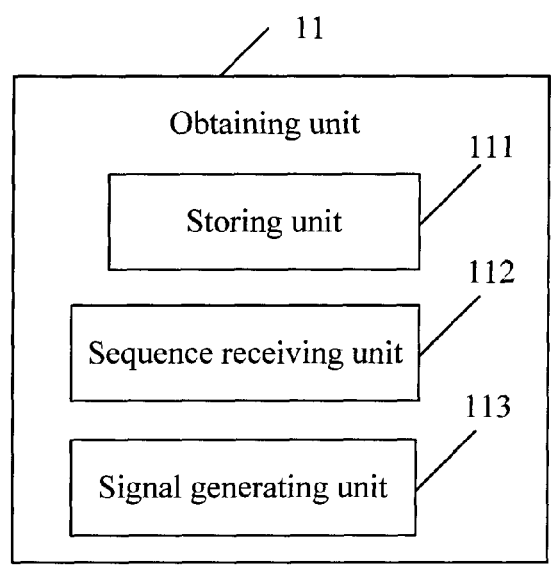
FIG. 4 shows a structure of a receiving unit of an opposite device in the system for eliminating the crosstalk between DSLs in the second embodiment.

FIG. 4 shows a structure of the receiving unit of the opposite device provided in this embodiment. The obtaining unit 11 of the opposite device may further include a storing unit 111, a sequence receiving unit 112, and a signal generating unit 113. The storing unit 111 is configured to store a sequence generator or a certain number of signal sequences. The sequence receiving unit 112 is configured to: receive the initial value of the sequence generator that is used to generate the signal sent to the new online opposite device and the time when the signal is sent, from the coordinated transceiver device when the sequence generator is stored in the storing unit; or receive the ID of the signal sequence that is used to generate the signal sent to the new online opposite device and the time when the signal is sent, from the coordinated transceiver device when a certain number of signal sequences are stored in the storing unit. The signal generating unit 113 is configured to: generate the signal that the coordinated transceiver device sends to the new online opposite device according to the sequence generator, the initial value of the sequence generator and the time when the signal is sent when the sequence generator is stored in the storing unit; or generate the signal that the coordinated transceiver device sends to the new online opposite device according to the signal sequences, the ID of the signal sequence and the time when the signal is sent when a certain number of signal sequences are stored in the storing unit.

Figure 5:
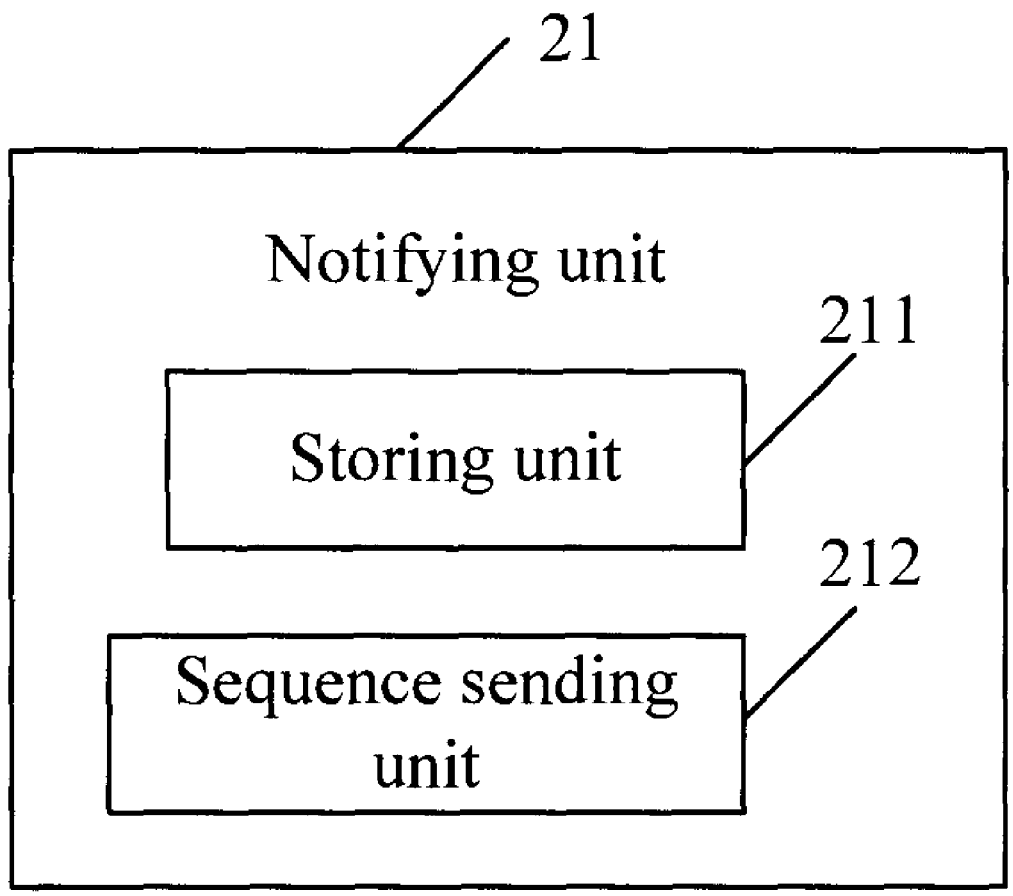
FIG. 5 shows a structure of a sending unit of a coordinated transceiver device in the system for eliminating the crosstalk between DSLs in the second embodiment.

FIG. 5 shows a structure of the sending unit of the coordinated transceiver device provided in this embodiment. The notifying unit 21 of the coordinated transceiver device may further include a storing unit 211 and a sequence sending unit 212. The storing unit 211 is configured to store a sequence generator or a certain number of signal sequences. The sequence sending unit 212 is configured to: send the initial value of the sequence generator that generates the signal sent to the new online opposite device and the time when the signal is sent, to the existing online opposite device when the sequence generator is stored in the storing unit; or send the ID of the signal sequence that generates the signal sent to the new online opposite device and the time when the signal is sent, to the existing online opposite device when a certain number of signal sequences are stored in the storing unit.

According to the system and device for eliminating the crosstalk between DSLs in this embodiment, the opposite device performs the calculation, which greatly reduces the amount of data transmitted back to the coordinated transceiver device. Thus, the duration of the crosstalk that the new online opposite device generates on the existing online opposite device may be reduced, and the new opposite device may join the vector group faster.

It is understandable to those skilled in the art that all or part of steps of the preceding method provided in disclosed embodiments may be implemented by a program that instructs related hardware, where the program may be stored in a computer-readable storage medium.

The storage medium may be a read-only memory, a magnetic disk or a compact disk.

Although the examples have been described through some exemplary embodiments and accompanying drawings, the disclosed embodiments are not limited to such embodiments. It is apparent that those skilled in the art can make various modifications and variations to the embodiments without departing from the spirit and scope of the examples. The disclosed embodiments are intended to cover the modifications and variations provided that they fall in the scope of protection defined by the following claims or their equivalents.

What is claimed is:

1. A method for eliminating crosstalk between digital subscriber lines (DSLs), comprising:
   notifying, by a coordinated transceiver device, an existing online opposite device of a signal sent to a new online opposite device, the notifying comprising
      sending, by the coordinated transceiver device, an initial value of a sequence generator that is used to generate the signal and a time when the signal is sent, to the existing online opposite device, wherein sequence generators with the same structure are respectively configured in the coordinated transceiver device and the existing online opposite device; and
      obtaining, by the existing online opposite device, the signal according to the configured sequence generator, the initial value of the sequence generator, and the time when the signal is sent;
   receiving, by the coordinated transceiver device, a result of a calculation that is obtained by the existing online opposite device, wherein the calculation is performed based on a detected error signal and the signal sent to the new online opposite device; and
   updating, by the coordinated transceiver device, a coefficient of a vector pre-encoder based on the calculation result.

2. The method of claim 1, wherein the calculation based on the detected error signal and the signal sent to the new online opposite device comprises:
   multiplying a conjugation of the signal sent to the new online opposite device by the error signal; and
   accumulating a multiplying product for a predetermined period of time.

3. The method of claim 2, wherein the coefficient of the vector pre-encoder is adapted to eliminate the crosstalk that the new online opposite device generates on the existing online opposite device, and
   wherein the updating the coefficient of the vector pre-encoder based on the calculation result by the coordinated transceiver device comprises:
      subtracting, by the coordinated transceiver device, the multiplying product of the calculation result and an adaptive step factor, from the coefficient of the vector pre-encoder.

4. The method of claim 1, wherein the calculation based on the detected error signal and the signal sent to the new online opposite device comprises:
   multiplying a conjugation of the signal sent to the new online opposite device by an adaptive step factor, and
   accumulating a multiplying product for a predetermined period of time.

5. The method of claim 4, wherein the updating the coefficient of the vector pre-encoder based on the calculation result by the coordinated transceiver device comprises:
   subtracting, by the coordinated transceiver device, the calculation result from the coefficient of the vector pre-encoder.

6. The method of claim 1, wherein the error signal is detected through:
   judging, by the existing online opposite device, a received sample to obtain a decision sample, and
   obtaining, by the existing online opposite device, the error signal according to a difference between the received sample and the decision sample.

7. A method for eliminating crosstalk between digital subscriber lines (DSLs), comprising:
   notifying, by a coordinated transceiver device, an existing online opposite device of a signal sent to a new online opposite device, comprising
      sending, by the coordinated transceiver device, an ID of a signal sequence that is used to generate the signal and a time when the signal is sent, to the existing online opposite device, wherein a certain number of same signal sequences are respectively pre-stored in the coordinated transceiver device and the existing online opposite device; and
      obtaining, by the existing online opposite device, the signal according to the stored signal sequences, the ID of the signal sequence, and the time when the signal is sent;
   receiving, by the coordinated transceiver device, a result of a calculation that is obtained by the existing online opposite device, wherein the calculation is performed based on a detected error signal and the signal sent to the new online opposite device; and
   updating, by the coordinated transceiver device, a coefficient of a vector pre-encoder based on the calculation result.

8. The method of claim 7, wherein the calculation based on the detected error signal and the signal sent to the new online opposite device comprises:
   multiplying a conjugation of the signal sent to the new online opposite device by the error signal; and
   accumulating a multiplying product for a predetermined period of time.

9. The method of claim 8, wherein the coefficient of the vector pre-encoder is adapted to eliminate the crosstalk that the new online opposite device generates on the existing online opposite device, and
   wherein the updating the coefficient of the vector pre-encoder based on the calculation result by the coordinated transceiver device comprises:
      subtracting, by the coordinated transceiver device, the multiplying product of the calculation result and an adaptive step factor, from the coefficient of the vector pre-encoder.

10. The method of claim 7, wherein the calculation based on the detected error signal and the signal sent to the new online opposite device comprises:
   multiplying a conjugation of the signal sent to the new online opposite device by an adaptive step factor, and
   accumulating a multiplying product for a predetermined period of time.

11. The method of claim 10, wherein the updating the coefficient of the vector pre-encoder based on the calculation result by the coordinated transceiver device comprises:
   subtracting, by the coordinated transceiver device, the calculation result from the coefficient of the vector pre-encoder.

12. The method of claim 7, wherein the error signal is detected through:
   judging, by the existing online opposite device, a received sample to obtain a decision sample, and
   obtaining, by the existing online opposite device, the error signal according to a difference between the received sample and the decision sample.

13. A digital subscriber line (DSL) coordinated transceiver device, comprising:
   a notifying unit, adapted to notify an existing online opposite device of a signal sent to a new online opposite device, the notifying unit comprising:
      a storing unit, adapted to store a sequence generator; and
      a sequence sending unit, adapted to send an initial value of the sequence generator that is used to generate the signal and a time when the signal is sent, to the existing online opposite device, so as to inform the existing online opposite device to obtain the signal according to the initial value and perform the calculation;
   a receiving unit, adapted to receive a calculation result fed back by the existing online opposite device, wherein the calculation result is obtained by the existing online opposite through performing a calculation based on a detected error signal and the signal sent to the new online opposite device; and
   an updating unit, adapted to update a coefficient of a vector pre-encoder according to the calculation result.

14. A digital subscriber line (DSL) coordinated transceiver device, comprising:
   a notifying unit, adapted to notify an existing online opposite device of a signal sent to a new online opposite device, the notifying unit comprising:
      a storing unit, adapted to store a predetermined number of signal sequences; and
      a sequence sending unit, adapted to send an ID of a signal sequence that is used to generate the signal and a time when the signal is sent, to the existing online opposite device, so as to inform the existing online opposite device to obtain the signal according to the ID and perform the calculation;
   a receiving unit, adapted to receive a calculation result fed back by the existing online opposite device, wherein the calculation result is obtained by the existing online opposite through performing a calculation based on a detected error signal and the signal sent to the new online opposite device; and
   an updating unit, adapted to update a coefficient of a vector pre-encoder according to the calculation result.

15. A system for eliminating crosstalk between digital subscriber lines (DSLs), comprising:
   a coordinated transceiver device, comprising:
      a notifying unit, adapted to notify an existing online opposite device of a signal sent to a new online opposite device;
      a receiving unit, adapted to receive a calculation result fed back by an existing online opposite device; and
      an updating unit, adapted to update a coefficient of a vector pre-encoder based on the calculation result; and
   an opposite device, comprising:
      an obtaining unit, adapted to obtain the signal that the coordinated transceiver device sends to the new online opposite device, the obtaining unit comprising:
         a storing unit, adapted to store a sequence generator;
         a sequence receiving unit, adapted to receive an initial value of the sequence generator that generates the signal sent to the new online opposite device and a time when the signal is sent, from the coordinated transceiver device; and
         a signal generating unit, adapted to generate the signal that the coordinated transceiver device sends to the new online opposite device according to the configured sequence generator, the initial value of the sequence generator, and the time when the signal is sent
      a detecting unit, adapted to detect an error signal;
      a calculating unit, adapted to perform a calculation based on the detected error signal and the obtained signal sent to the new online opposite device; and
      a feedback unit, adapted to feed back a calculation result of the calculating unit to the coordinated transceiver device.

16. A system for eliminating crosstalk between digital subscriber lines (DSLs), comprising:
   a coordinated transceiver device, comprising:
      a notifying unit, adapted to notify an existing online opposite device of a signal sent to the new online opposite device;
      a receiving unit, adapted to receive a calculation result fed back by an existing online opposite device; and
      an updating unit, adapted to update a coefficient of a vector pre-encoder based on the calculation result; and
   an opposite device, comprising:
      an obtaining unit, adapted to obtain a signal that the coordinated transceiver device sends to the new online opposite device, the obtaining unit comprising:
         a storing unit, adapted to store a predetermined number of signal sequences;
         a sequence receiving unit, adapted to receive an ID of a signal sequence that is used to generate the signal and a time when the signal is sent, from the coordinated transceiver device; and
         a signal generating unit, adapted to generate the signal that the coordinated transceiver device sends to the new online opposite device according to the stored signal sequence, the ID of the signal sequence, and the time when the signal is sent
      a detecting unit, adapted to detect an error signal;
      a calculating unit, adapted to perform a calculation based on the detected error signal and the obtained signal sent to the new online opposite device; and
      a feedback unit, adapted to feed back a calculation result of the calculating unit to the coordinated transceiver device.

* * * * *